US006100503A

United States Patent [19]

Sasaki et al.

[11] Patent Number: 6,100,503

[45] Date of Patent: Aug. 8, 2000

[54] HEAT COOKING DEVICE WITH A HEATING PORTION FORMED FROM A HEAT EMITTING MEMBER AND AN INSULATOR

[75] Inventors: Takanori Sasaki; Osamu Sugimori, both of Otsu, Japan

[73] Assignee: Sanyo Electric Co., Ltd., Moriguchi, Japan

[21] Appl. No.: 09/257,235

[22] Filed: Feb. 25, 1999

[30] Foreign Application Priority Data

Feb. 27, 1998 [JP] Japan ................................ 10-047264

[51] Int. Cl.$^{7}$ ........................................ A21B 1/00

[52] U.S. Cl. ........................ 219/411; 219/400; 219/536

[58] Field of Search ................................ 219/411, 400, 219/402, 405, 403, 404, 406, 408, 536, 537

[56] References Cited

U.S. PATENT DOCUMENTS 4,292,504 9/1981 Gebarowski et al. .................. 219/542
4,480,164 10/1984 Dills ................................ 219/10.55 B
5,089,679 2/1992 Eke ................................ 219/10.55 B
5,196,678 3/1993 Doerner ................................ 219/542

FOREIGN PATENT DOCUMENTS 2275405 8/1994 United Kingdom .

*Primary Examiner*—Teresa Walberg
*Assistant Examiner*—Shawntina Fuqua
*Attorney, Agent, or Firm*—Armstrong, Westerman, Hattori, McLeland & Naughton

[57] ABSTRACT

A heat cooking device is provided with a heater. The heater is formed of a case member, a base filling the case member, and a heat emitting member provided on one side of the base. The base is formed of insulator. An outer periphery of the heat cooking device is covered by an exterior portion. The base is positioned between the exterior portion and the heat emitting member. Thus, less heat from the heat emitting member is transferred to the exterior portion when the heat emitting member is used to heat food.

17 Claims, 22 Drawing Sheets

HEAT COOKING DEVICE WITH A HEATING PORTION FORMED FROM A HEAT EMITTING MEMBER AND AN INSULATOR

BACKGROUND OF THE INVENTION

1. Field of the Invention

The present invention relates to heat cooking devices and particularly to heat cooking devices using a heat emitting member to heat the interior of the heating chamber.

2. Description of the Background Art

FIG. 26 schematically shows an example of an internal structure of a conventional heat cooking device. In the heat cooking device, a heating chamber 250 has its outer periphery covered by an exterior portion 200. In conventional heat cooking devices, heating chamber 250 is internally heated by a heater 300 to heat and cook a food 400 placed on a turn table 260 in heating chamber 250. Heater 300 is e.g. a quartz heater, a sheathed heater or the like. To more efficiently heat food 400, there is provided a reflective plate 301 formed of metal or the like and covering an upper portion of heater 300.

In conventional heat cooking devices, however, reflective plate 301 is heated by heater 300. Thus, heat cooking via heater 300 can result in exterior portion 200 being heated to as high a temperature as approximately 120° C.

Since the user can touch exterior portion 200, conventional heat cooking devices having exterior portion 200 heated to the high temperature mentioned above is unsafe.

SUMMARY OF THE INVENTION

The present invention has been made considering the condition described above.

One object of the present invention is to provide a safe heat-cooking device.

Still another object of the present invention is to provide a heat-cooking device which does not damage food.

Still another object of the present invention is to provide a heat-cooking device capable of uniformly heating foods.

In one aspect of the present invention,sa heat cooking device is provided with a heating chamber housing a food, an exterior portion covering an outer periphery of the heating chamber, and a heating portion heating a food, the heating chamber including a base formed of an insulator, and a heat-emitting member mounted at one side of the base and emitting heat, the base having one side opposite to the heating chamber and the other side opposite to the exterior portion, one side of the base being opposite to the other side of the base.

In the heat cooking device in accordance with the present invention, the heating portion is such provided that the base having the heat emitting member mounted thereon has one side opposite to the heating chamber and the other side opposite to the exterior portion, one side of the base being opposite to the other side of the base.

Since the base formed of insulator exists between the heating member and the exterior portion, in heating via the heating portion the exterior portion can less be heated to provide a safe heat-cooking device.

The heat cooking device also includes an air introducing portion introducing air from outside the heat cooking device to inside the heat cooking device, the heating portion further including a case member housing the base and the heat emitting member, the case member having an introduction hole introducing air from outside the case member to one side of the base and an exhaust hole exhausting air outside the case member.

Thus, the air introduced from the air introducing portion is introduced via the introduction hole into the case member at a vicinity of the heat emitting member and exhausted via the exhaust hole to outside the case member.

Thus, when the base is heated excessively at a vicinity of one side having the heat emitting member mounted thereon, the heated portion can be cooled with air to prevent the heat cooking device from being partially, excessively heated.

Still preferably, the introduction hole and the exhaust hole are formed in that side of the case member which faces inwards in the heat cooking device.

Thus, the air leaking from one side of the base via the introduction hole and the air exhausted from the exhaust hole flow inwards in the heat cooking device.

Thus, the heated air flowing from one side of the base excessively heated can be prevented from leaking directly outside the heat cooking device to provide a safer heat-cooking device.

Still preferably, the heating portion is provided outside the heating chamber.

Thus, the heating chamber can be mounted more readily than when it is mounted inside the heating chamber. This facilitates manufacturing the heat cooking device.

Still preferably, the heating portion is provided over an upper side of the heating chamber with one side of the base facing downward, also including a sheet positioned under the base and over the heating chamber and covering the base, the heating chamber having in the upper side an upper hole linking the heating chamber and the heating portion together.

Thus, the heating portion is provided over the heating chamber, with one side of the base facing downward. Also, the heated air flowing from one side of the heated base flows via the upper hole into the heating chamber. A sheet is also provided between the base and the heating chamber, covering the base.

Thus, the food in the heating chamber can be prevented from dropping into the heating portion and thus soiling the heating portion and thus burning out on the heated heating portion. Furthermore, the food in the heating chamber can be heated effectively and uniformly. The base and the heat emitting member can also be prevented from dropping into the heating chamber via the upper hole.

Still preferably, the sheet is fixed by being sandwiched between the case member and an upper side of the heating chamber.

The fixed sheet can more reliably prevent the base and the heat emitting member from dropping into the heating chamber via the upper hole and thus damage of the food in the chamber can be prevented.

Still preferably, the heat cooking device also includes a flexure preventing portion preventing flexure of the sheet.

Thus, the sheet can be prevented from flexing and thus contacting other members and degrading.

Still preferably, the heat cooking device also includes a member ensuring a predetermined distance between the heat emitting member and the sheet.

Thus the distance ensuring portion allows the sheet to be distant from the heat emitting portion by the predetermined distance.

This can prevent the sheet from preventing the heat emission from the heat emitting member so as to prevent the sheet from degrading and thus dropping onto the food.

Still preferably, the heat emitting member is formed into a strip having a tab portion located on one side and fitted into the base member to mount the heat emitting member onto the one side of the base.

Thus, an additional member is not required for mounting the heat emitting member onto one side of the base so as to manufacture the heat cooking device more readily at lower cost.

Still preferably, the tab portion has a protrusion.

Thus the emitting member is mounted onto one side of the base by fitting the tab portion with a protrusion into the base member.

Thus, the protrusion of the tab portion engages with the base member to allow the heat emitting member buried in the base member to be fixed more firmly.

Still preferably, the heat emitting member is formed from metal or alloy and also includes a power supply portion supplying power to generate heat, and the base is formed of microporous insulator.

Thus the heat emitting member is formed of metal or alloy serving as a heat conducting material and the base is formed of microporous insulator provided as an exemplary insulator and serving as thermally and electrically insulating substance.

Thus, the heat emitting member can be prepared more readily and the electric power supplied by the heat emitting member can be prevented from being lost at the base. Thus a heat cooking device can be prevented which can be manufactured more readily and have better heat efficiency.

Still preferably, the heating portion also includes a coating layer coating a surface of the base.

Thus, the shape of the base can be prevented from deformation.

In another aspect of the present invention, the heat cooking device includes a heat chamber housing foods, a heating portion heating foods, a temperature detecting portion detecting a temperature around the heating portion, and a temperature adjusting portion stopping the heating portion from heating when a temperature detected by the temperature detecting portion reaches a predetermined temperature.

Thus, the heat cooking device can be prevented from reaching high, dangerous temperature.

In still another aspect of the present invention, the heat cooking device includes a heating chamber housing foods, a heating portion heating foods, a food plate placing foods thereon, and a food turning portion turning the food plate in a horizontal plane. The heating portion also includes a base formed of insulator, and a heat emitting member mounted at one side of the base and emitting heat. The portion of the heat emitting member covering the food plate is adapted to be increased in density with increased turning radius of the food plate, with the food turning portion turning the food plate.

Thus the heating portion heats a food placed on the food plate at a longer turning radius more strongly than a food placed on the food plate at a shorter turning radius. It should be noted that if the heating portion is provided corresponding to the food plate partially, a location on the food plate at a longer turning radius moves to a position farther from the heating portion than a location on the food plate at a shorter turning radius when the food turning portion turns the food plate.

Thus, a portion closer to the periphery of the heating chamber and thus considered to be lower in temperature can be heated more intensively. Thus, the food on the food plate can be prevented from being heated unevenly. If the heating portion is provided corresponding to the food plate partially, a food placed at a location moving to a position more distant from the heating portion can be heated more intensively than a food placed at a location less distant from the heating portion when the food turning portion turns the food plate. Thus, the foods on the food plate can more reliably be prevented from being heated unevenly.

Still preferably, the heating portion covers the food plate partially rather than entirely.

Thus, the food on the food plate can be prevented from being heated unevenly, to reduce the cost for manufacturing the heat cooking device.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, a microwave oven capable of heating via a heater and heating through high frequency waves will now be described as one example of the heat cooking device in accordance with the present invention.

Figure 1A:
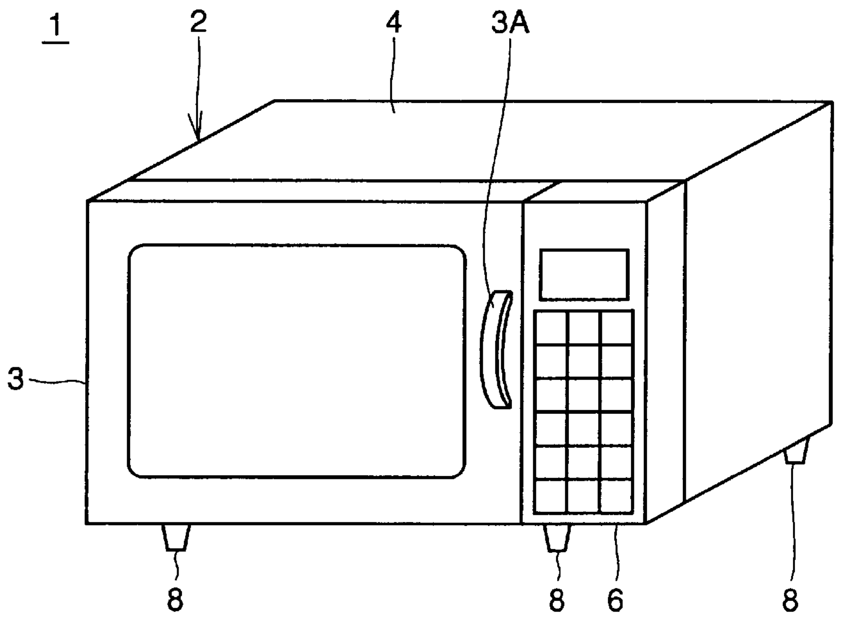
FIGS. 1A and 1B show a microwave oven as one embodiment of the heat cooking device in accordance with the present invention.

FIG. 1A is a perspective view of a microwave oven 1 formed mainly of a body 2, a door 3, a control panel 6 and a plurality of feets 8. Body 2 is provided with an exterior portion 4 covering an outer periphery of body 2. Control panel 6 is provided on a front side of microwave oven 1 for the user to operate microwave oven 1.

Figure 1B:
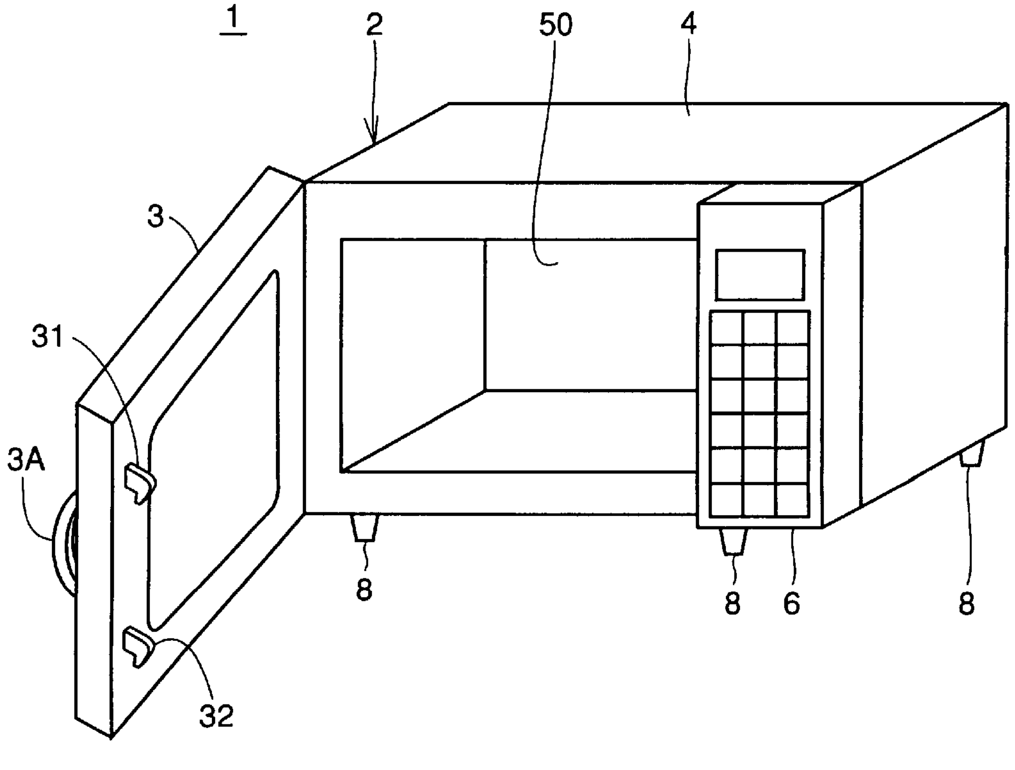

Door 3 has a handle 3A for the user to open and close door 3 and door 3 is opened and closed with its left end serving as the axis. FIG. 1B shows door 3 opened away. Beyond door 3, inside body 2 is provided is a heating chamber 50. Door 3 is also provided with door latches 31 and 32 protruding therefrom. It should be noted that door latches 31 and 32 fit into body 2 when door 3 is closed.

Over heating chamber 50 is provided a heater 7 described later, and beyond control panel 6 is provided a magnetron 10 described later. A food accommodated in heating chamber 50 is heated by heater 7 or magnetron 10. Feet 8 are provided on the body 2 bottom side at four corners.

Figure 2:
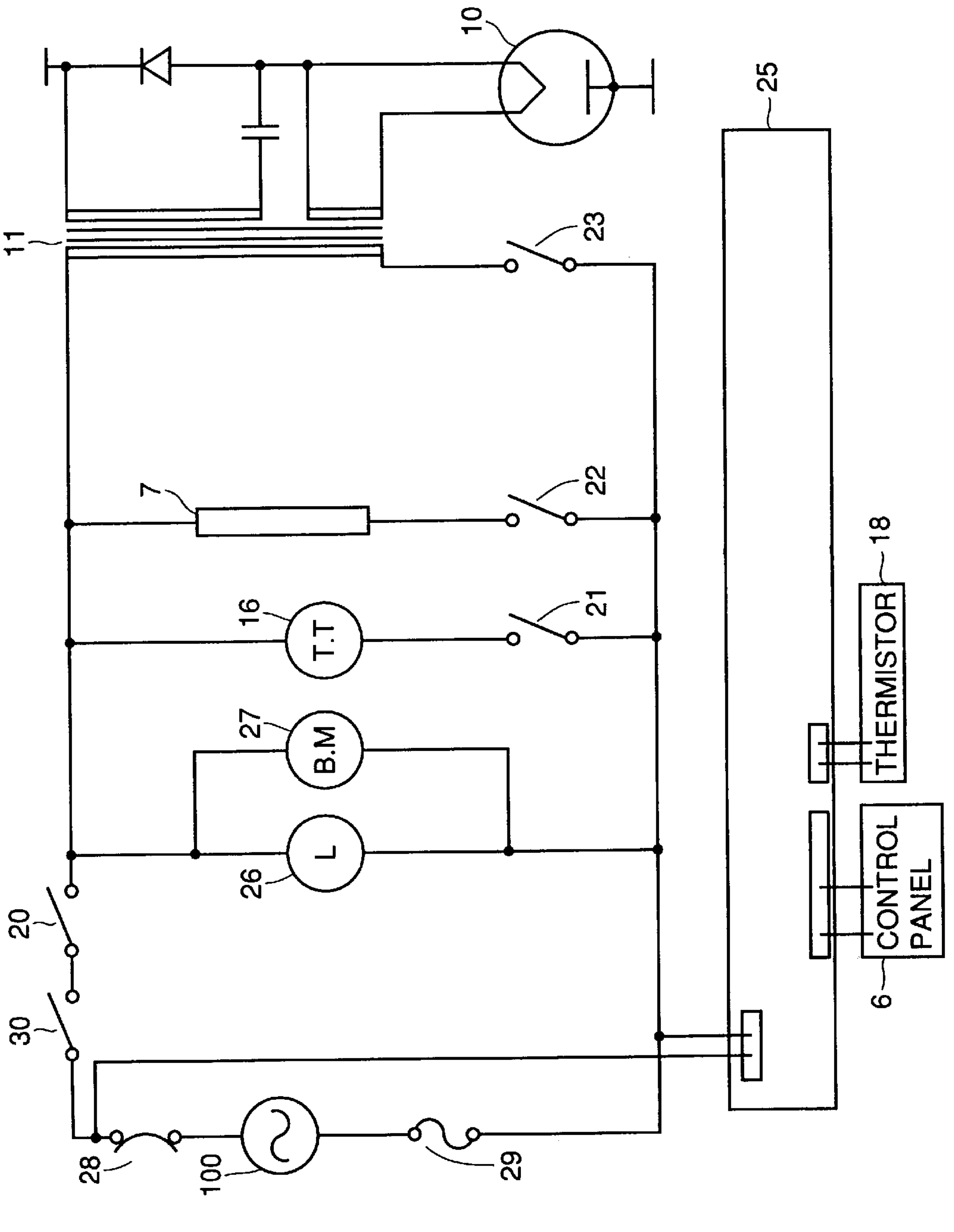
FIG. 2 schematically shows an electrical circuit of the FIGS. 1A and 1B microwave oven.

FIG. 2 schematically shows an electrical circuit of microwave oven 1. In FIG. 2, microwave oven 1 is provided with a control circuit 25 including a micro computer for controlling operation of microwave oven 1. Control circuit 25 is connected to control panel 6. Control circuit 25 controls microwave oven 1 according to data and the like input from control panel 6. Control circuit 25 can also be connected to a thermistor 18 (not shown in FIGS. 1A and 1B) provided near heating chamber 50 so that control circuit 25 may control microwave oven 1 according to the temperature of heating chamber 50 detected by thermistor 18.

A turntable motor 16 is a motor for driving a turntable (not shown) in heating chamber 50. There are also provided a relay 21 for turning on turntable motor 16, a relay 22 for turning on heater 7, a relay 23 for conducting power to a transformer 11 supplying power to magnetron 10 generating high-frequency (HF) electric waves. A heating-chamber light 26 illuminates heating chamber 50. A motor 27 dives a fan (a fan 55 described later) for cooling magnetron 10.

A door switch 30 opens the FIG. 2 circuit when door 3 is opened. A relay 20 conducts power to heating-chamber light 26 and motor 27. The opening and closing of relay 20 is controlled by control circuit 25, and so is the opening and closing of relays 21–23.

An alternating current (AC) power supply 100 supplies electric power to the entirety of the FIG. 2 circuit. There are also provided fuses 28 and 29. Fuse 29 is a temperature fuse. When in microwave oven 1 a portion other than heating chamber 50 reaches an extremely high temperature (e.g. 200° C.), fuse 29 opens a circuit to prevent microwave oven 1 from being further heated.

Figure 3A:
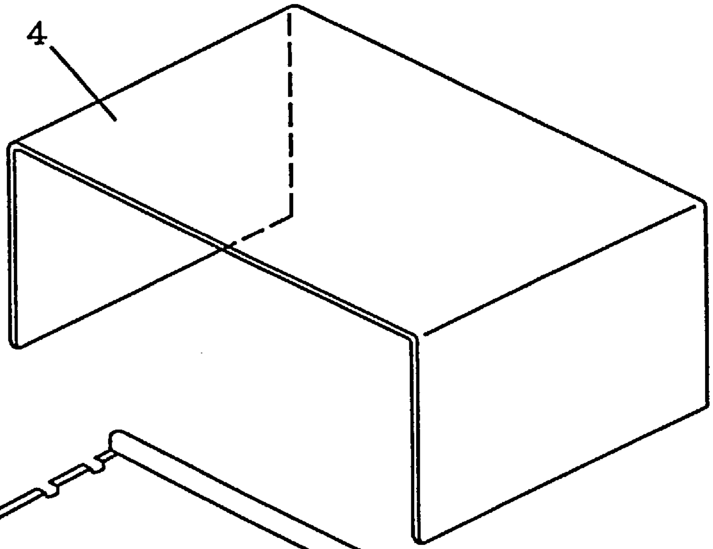
FIGS. 3A–3C show an exploded, partial view of the body of the FIGS. 1A and 1B microwave oven.
Figure 3B:
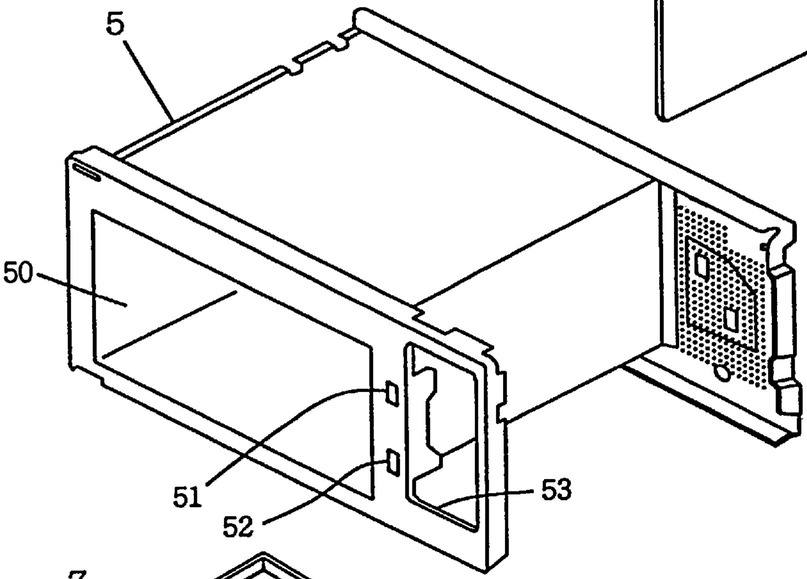
Figure 3C:
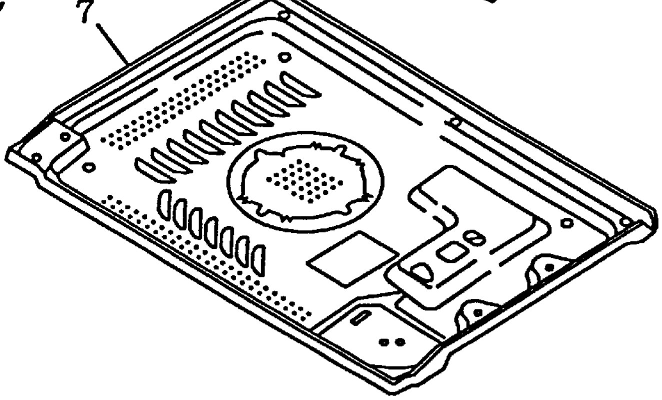

FIGS. 3A–3C are an exploded, perspective view of body 2 of microwave oven 1. Body 2 is formed mainly of exterior portion 4, a body frame 5, and a bottom plate 7. Body frame 5 is fixed onto bottom plate 7. Body frame 5 is provided with latch holes 51 and 52 receiving door latches 31 and 32, respectively, and a control-panel hole 53 for fitting control panel 6 therein. Body frame 5 is covered by exterior portion 4 after various parts (not shown) are mounted. The mounting of the various parts to body frame 5 will now be described.

Figure 4B:
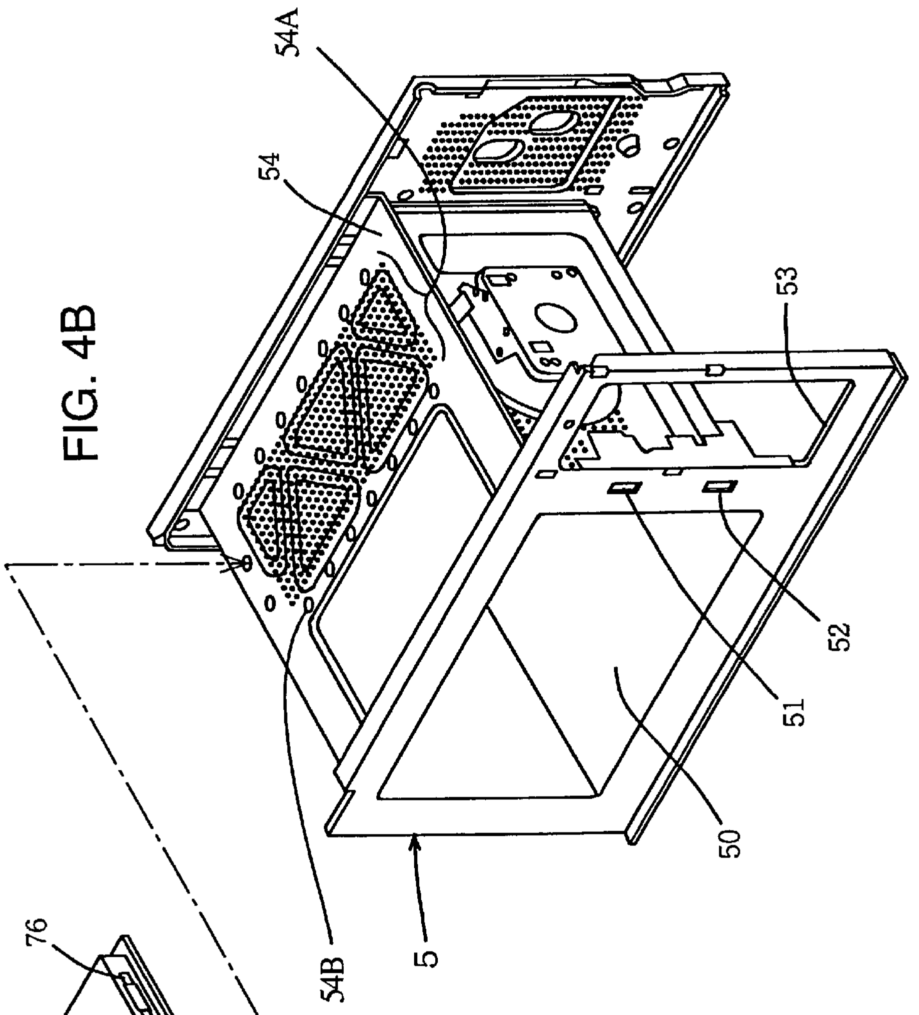
FIGS. 4A and 4B show a detailed configuration of a body frame of the FIGS. 3A–3C body.
Figure 4A:
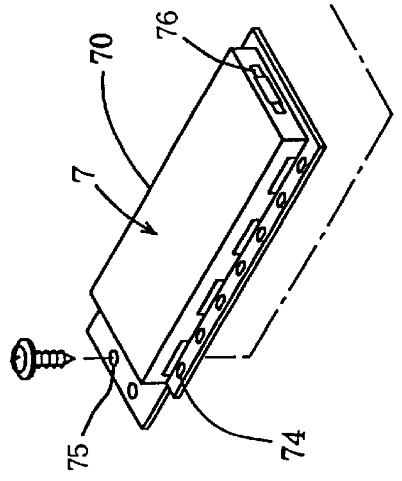
Figure 5:
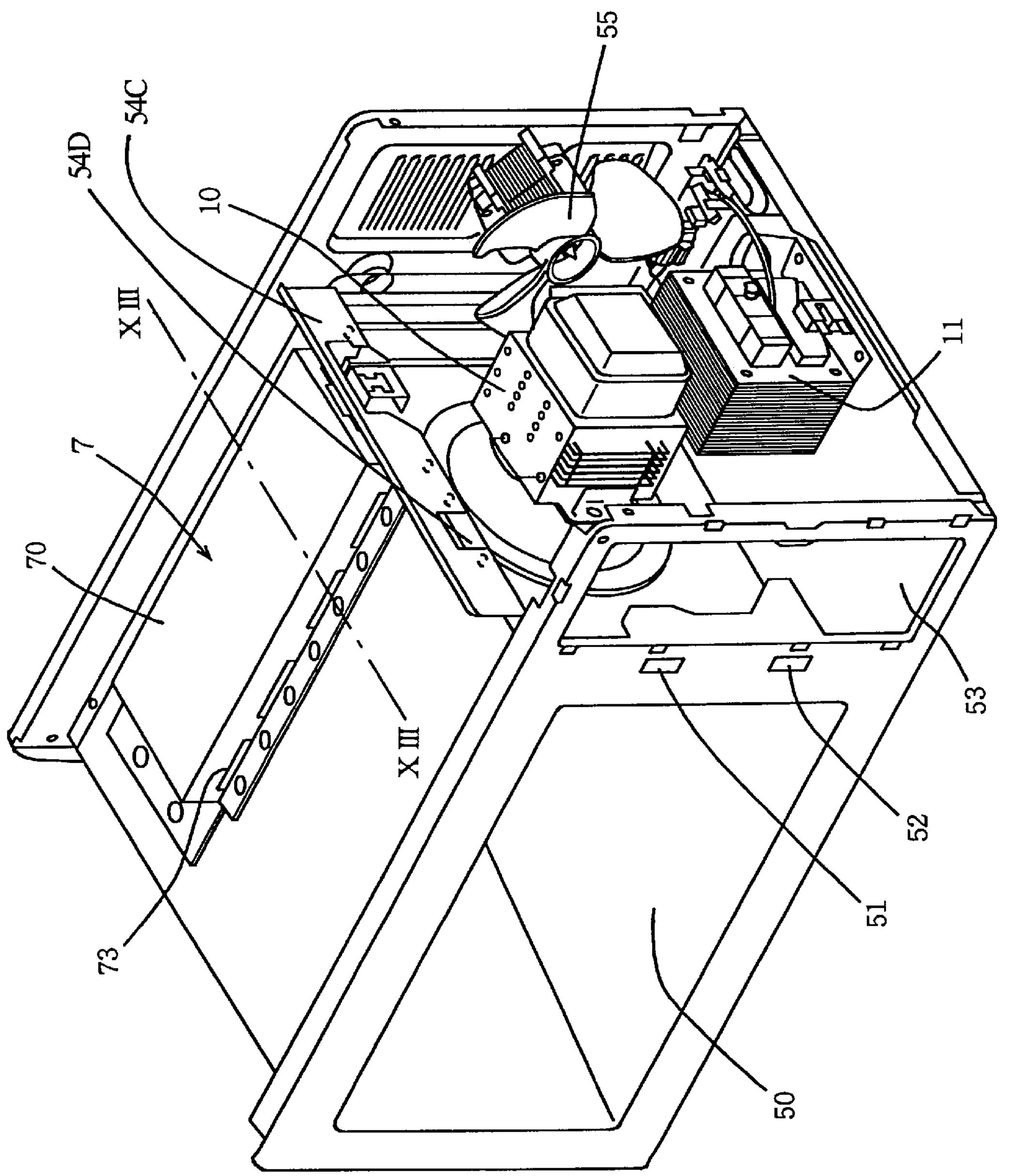
FIG. 5 shows a detailed configuration of the body frame of the FIGS. 3A–3C body.

FIGS. 4A and 4B and FIG. 5 show a detailed configuration of body frame 5. Referring first to FIGS. 4A and 4B, a large number of upper holes 54A are formed in a matrix in an upper surface 54 of body frame 5. A platelike heater 7 is mounted to upper surface 54 to cover upper holes 54A. Heater 7 has an outer periphery covered by a case member 70. Heater 7 is mounted to upper surface 54, as described below: initially, seven embossed portions (shown in FIG. 6) formed on either side of case member 70 are fitted into fitting holes 54B provided in upper surface 54 and corresponding to the respective embossed portions 74. Then, case member 70 is slid to engage embossed portions 74 with upper surface 54. Finally, heater 7 is screwed by means of a screw hole 75. Thus heater 7 is fixed to upper surface 54. It should be noted that a connection terminal 76 mounted to a side surface of case member 70 is for supplying electrical power to a heat emitting member (shown in FIG. 6) described later.

Referring then to FIG. 5, a magnetron 10, a transformer 11 and a fan 55 for cooling magnetron 10 are mounted to body frame 5 on the right side of heating chamber 50. A diaphragm 54C is also mounted to body frame 5. Fan 55 externally introduces air into microwave oven 1 to cool magnetron 10 and also sends air to heater 7 via an air hole 54d provided in diaphragm 54C. It should be noted that an introduction hole 73 is provided in the front side of case member 70, i.e. the side of case member 70 that faces inward in microwave oven 1. Introduction hole 73 introduces air introduced from fan 55 into case member 70.

Figure 6:
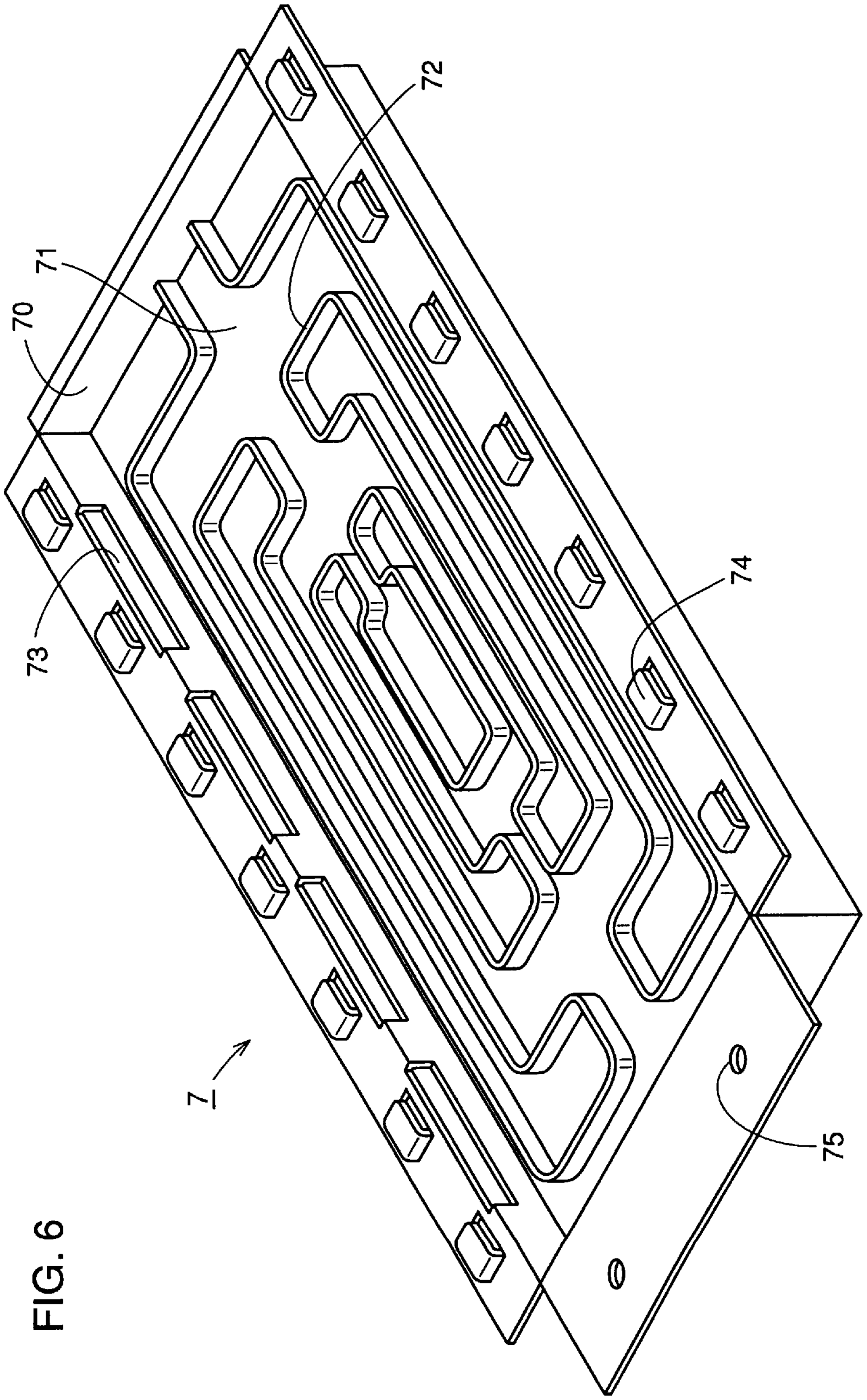
FIG. 6 is a perspective view of the FIG. 5 heater.

A configuration of heater 7 will now be described. FIG. 6 is a perspective view of heater 7, showing the rear side of the FIG. 5 heater 7. Referring to FIG. 6, case member 70 is a box member. A bottom portion of case member 70 is filled with a base 71. A heat emitting member 72 is placed on base 71. Base 71 is formed from insulator. It should be noted that base 71 in accordance with the present embodiment is preferably formed from microporous insulator.

Microporous insulator is an insulator containing microporous substance. Microporous substance is a porous or cellular substance having an essential cell-size less than the mean free path of air molecules at the standard temperature and pressure, i.e. on the order of no more than 100 nanometers, as described in GB 2275405 A. Microporous substance includes e.g. aerogel, a gel in which liquid phase is replaced by gas phase. A microporous insulator used in the present embodiment is obtained by adding a ceramic fiber reinforced material and titanium-oxide opacifier to a microporous substance of dry particles mixed with a small amount of alumina powder allowing for shrinkage for use at high temperature. The microporous insulator thus obtained has thermally and electrically insulating characteristics.

Figure 7:
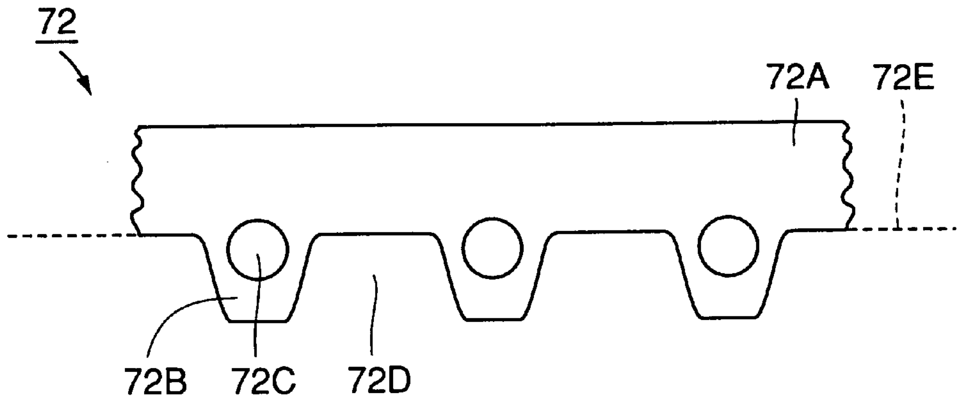
FIG. 7 shows a structure of the FIG. 5 heat emitting member.

Heat emitting member 72 is formed e.g. of metal or alloy. Heat emitting member 72 is electrically connected to above-mentioned connection terminal 76 (shown in FIGS. 4A and 4B) and thus supplied with power to emit heat. FIG. 7 shows a structure of heat emitting member 72. Heat emitting member 72 includes a strip 72A and tabs 72B. Tabs 72B are formed on one side of strip 72A at predetermined or random intervals 72D. Heat emitting member 72 is mounted on to base 71 by tabs 72B buried into base 71 below a line 72E shown in FIG. 7. Thus, in accordance with the present embodiment, heat emitting member 72 has strip 72A and tab 72B to dispense with an additional connection member when heat emitting member 72 is mounted onto base 71.

Figure 8:
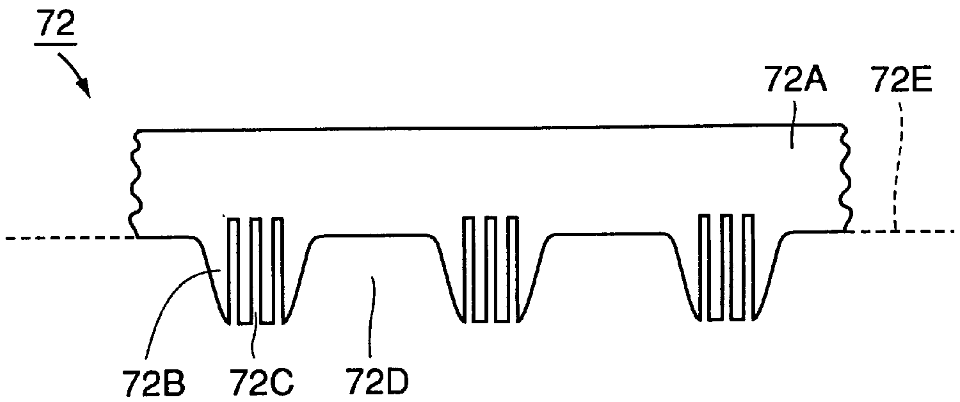
FIGS. 8–11 show modifications of the FIG. 7 heat emitting member.
Figure 9:
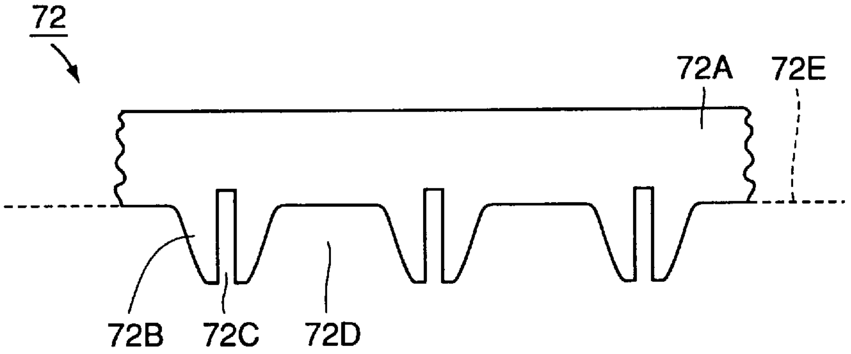
Figure 10:
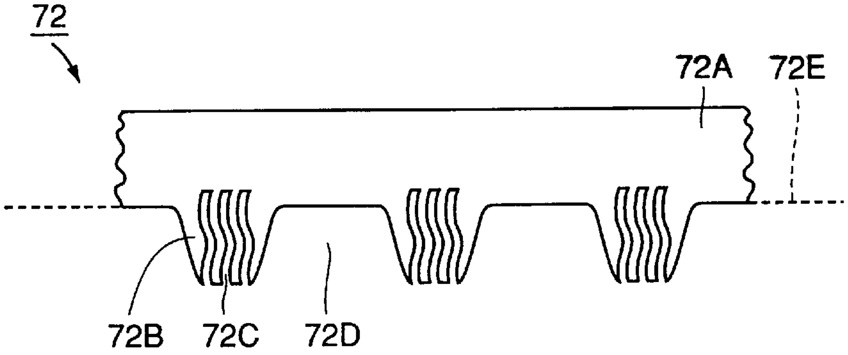
Figure 11:
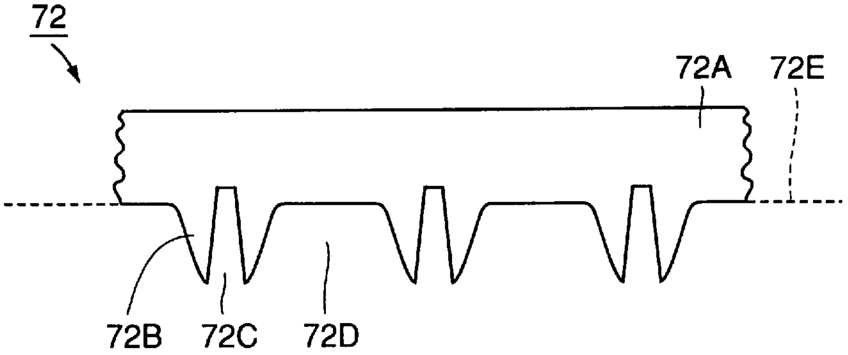

Tab 72*b* is provided with a respective hole 72C for reducing as much power supplied to heat emitting member 72 as possible that is not used for heat emitting in heat emitting member 72. It should be noted that the power that is not used for the heat emission in heat emitting member 72 is that supplied to base 71 via tab 72B. It should be noted that the shape of hole 72C is not limited to that shown in FIG. 7. More specifically, hole 72C may be a plurality of linear holes provided in a single tab 72B, as shown in FIG. 8. Hole 72C may also be a single linear hole provided in a single tab 72B, as shown in FIG. 9. Hole 72C may also be a waveform-like hole, as shown in FIG. 10. Hole 72C may also be a trapezoid hole, as shown in FIG. 11.

Figure 12:
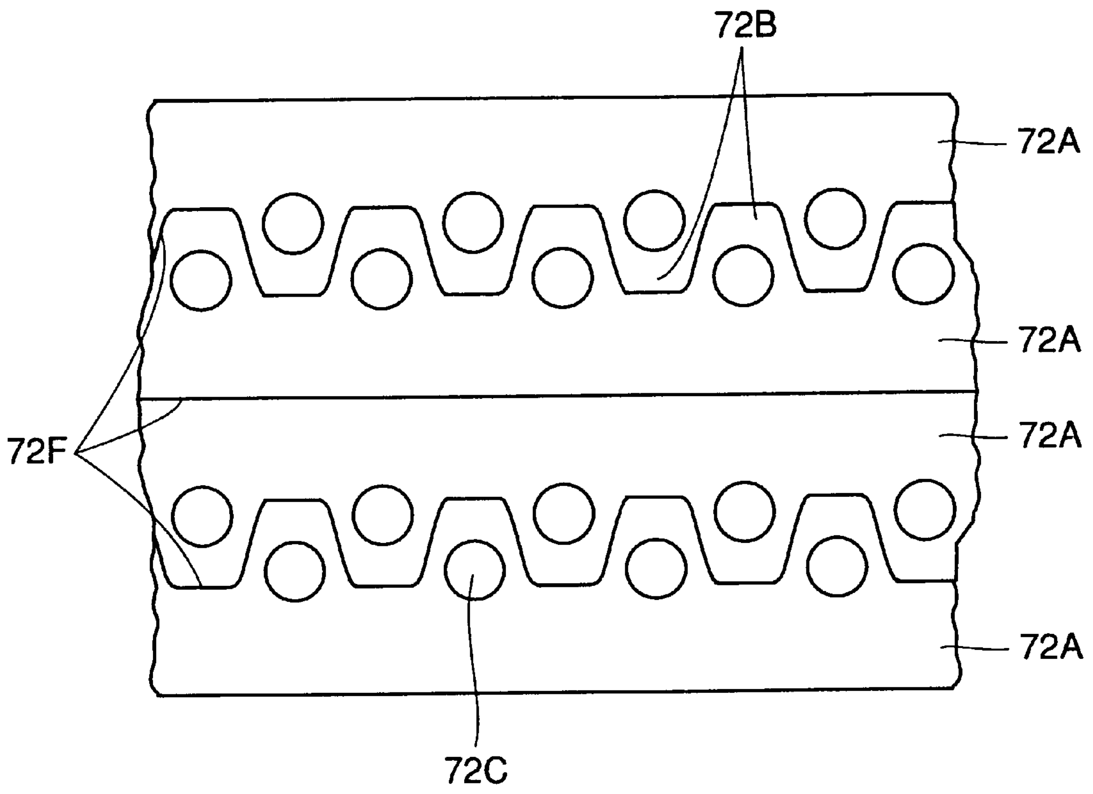
FIG. 12 is a view for illustrating a method of manufacturing the FIG. 7 heat emitting member.

A method of forming heat emitting member 72 described above will now be described with reference to FIG. 12. Initially, a metal or alloy serving as a material for heat emitting member 72 is formed into a strip having a predetermined length and a predetermined width. It should be noted that a predetermined width means such a width that four sheets of heat emitting members can be obtained in the longitudinal direction, as shown in FIG. 12. That portion of the metal or alloy which corresponds to hole 72C is then removed by punching or stamping. The punched or stamped metal or alloy is then cut along a line 72F to obtain heat emitting member 72. Forming heat emitting member 72 as described above can waste less of the material therefor.

Figure 13:
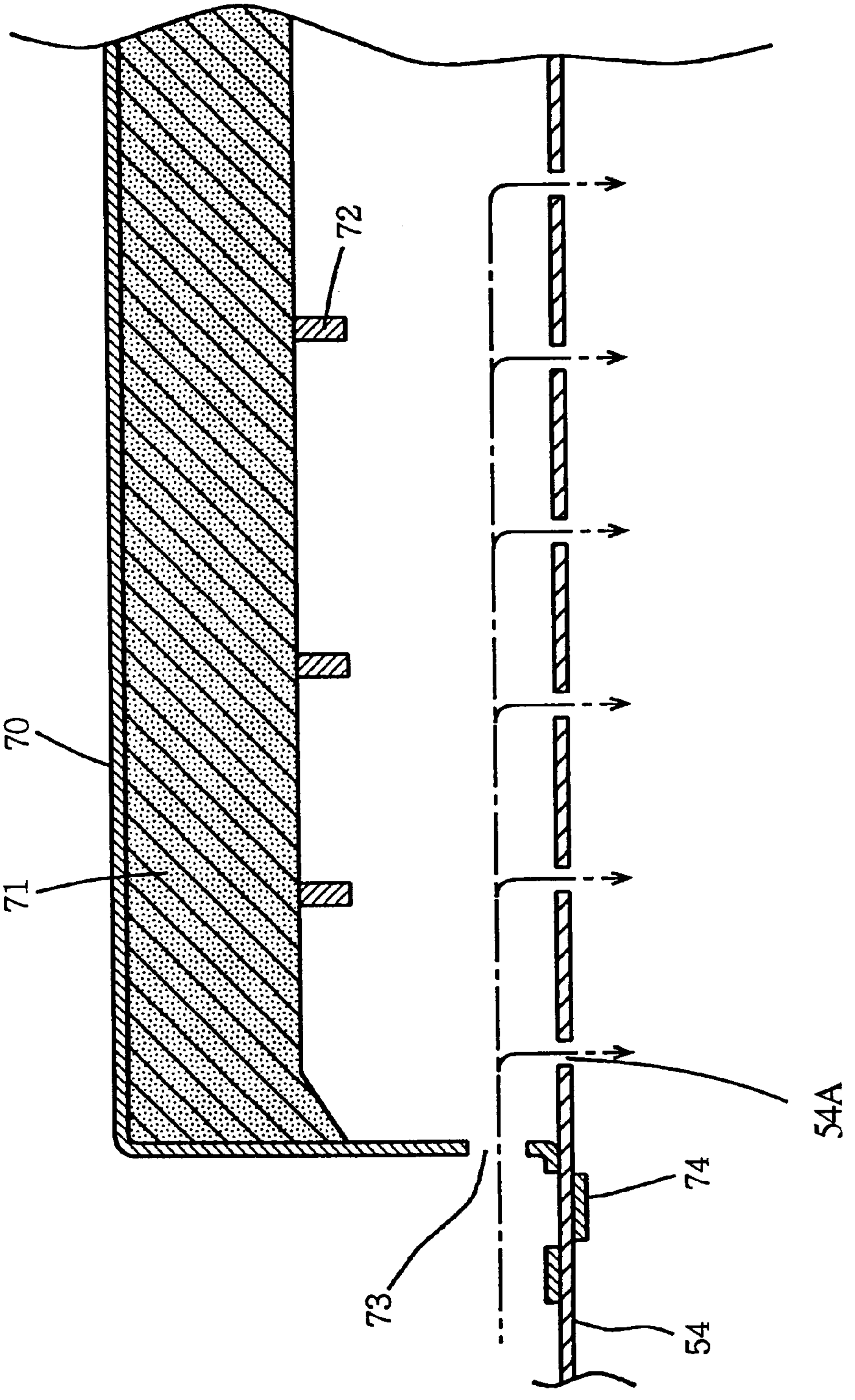
FIG. 13 is a partial cross-section along line XIII—XIII of FIG. 5.

A description will now be provided of the air flowing in heater 7 mounted onto body frame 5 upper surface 54 when heater 7 is used to provide heating. FIG. 13 is a partial cross-section along the XIII—XIII line of FIG. 5. In FIG. 13, the dashed line represents air flowing in heater 7. When fan 55 is actuated, air is introduced via air hole 54D (shown in FIG. 5) into case member 70 around heat emitting member 72. The air introduced into case member 70 flows via upper hole 54A to heating chamber 50. Thus the heat generated by heat emitting member 72 is sent to heating chamber 50 more reliably and more efficiently.

In microwave oven 1 according to the present embodiment, heater 7 has heat emitting member 72 mounted opposite to heating chamber 50 and base 71 mounted opposite to exterior portion 4. Thus, base 71 formed of insulator exists between heat emitting member 72 and exterior portion 4. Thus, heat generated by heat emitting member 72 is not only sent to heating chamber 50 efficiently but also less likely to be transferred to exterior portion 4. Thus, microwave oven 1 has better heating efficiency and is also safer.

However, less of the heat generated by heat emitting member 72 diverges than conventional and microwave oven 1 thus reaches a high temperature locally around heat emitting member 72. This can damage components near heat emitting member 72. Accordingly, in microwave oven 1 the air sent from fan 55, as described above, is also sent to around heat emitting member 72. Thus microwave oven 1 can be prevented from reaching a high temperature locally around heat emitting member 72.

Figure 14:
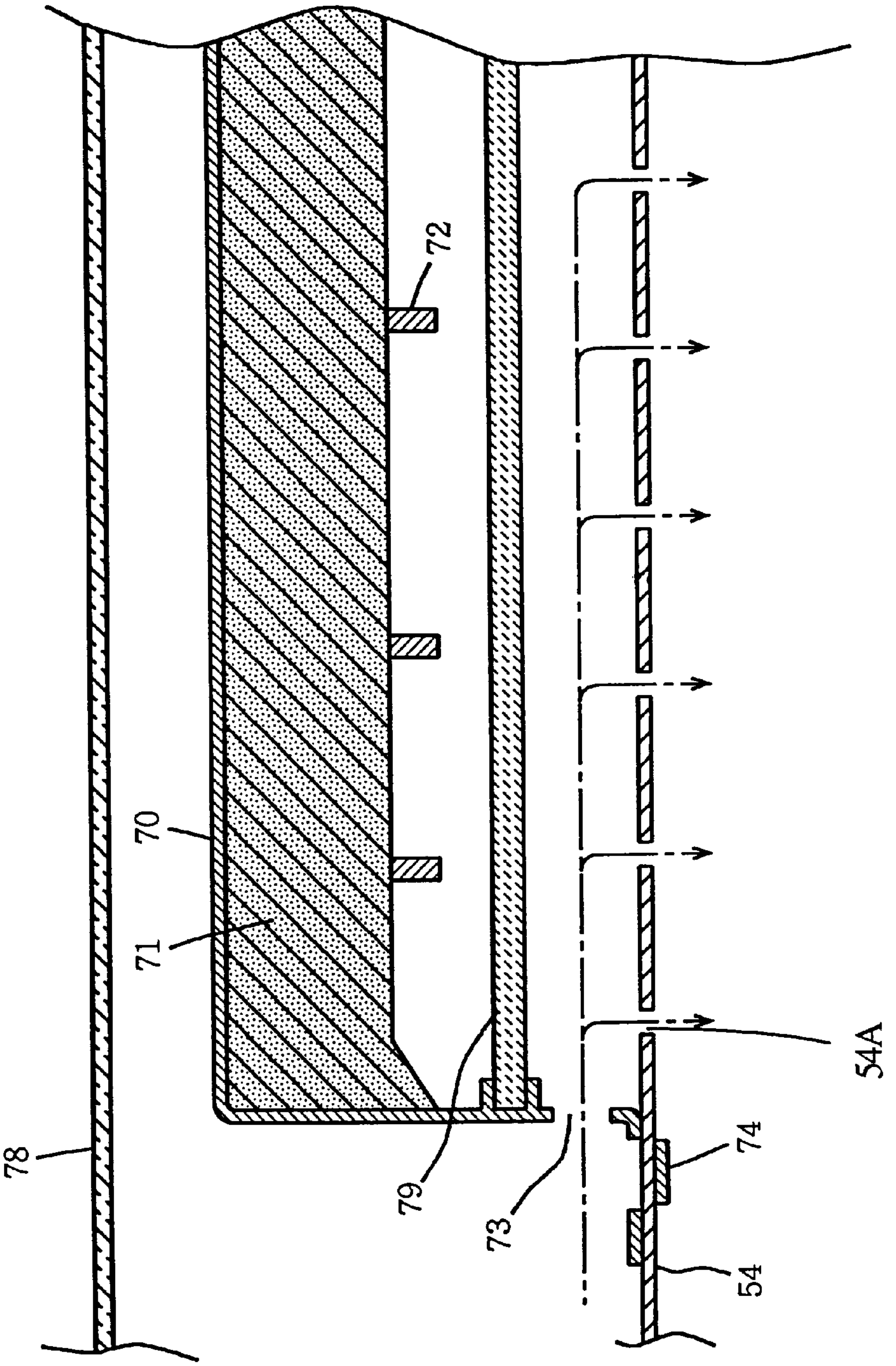
FIG. 14 is a modification of the FIG. 13 heater.

The microporous insulator forming base 71 in the present embodiment can partially exfoliate and drop off due to vibration or the like, since the microporous insulator is such structured that a sand-like substance is put together and set. If the sand-like substance has dropped, it can drop to heating chamber 50 through upper hole 54A. Accordingly, it is preferable that a sheet 79 positioned under base 71 and over upper surface 54 be further provided in case member 70, as shown in FIG. 14. In using heat emitting member 72 in microwave oven 1 to provide heating, the temperature of heat emitting member 72 is considered to increase to approximately 480° C. and sheet 79 is thus preferably formed of heat-resistant material, such as heat-resistant glass, a quartz plate, a mica sheet.

Figure 15:
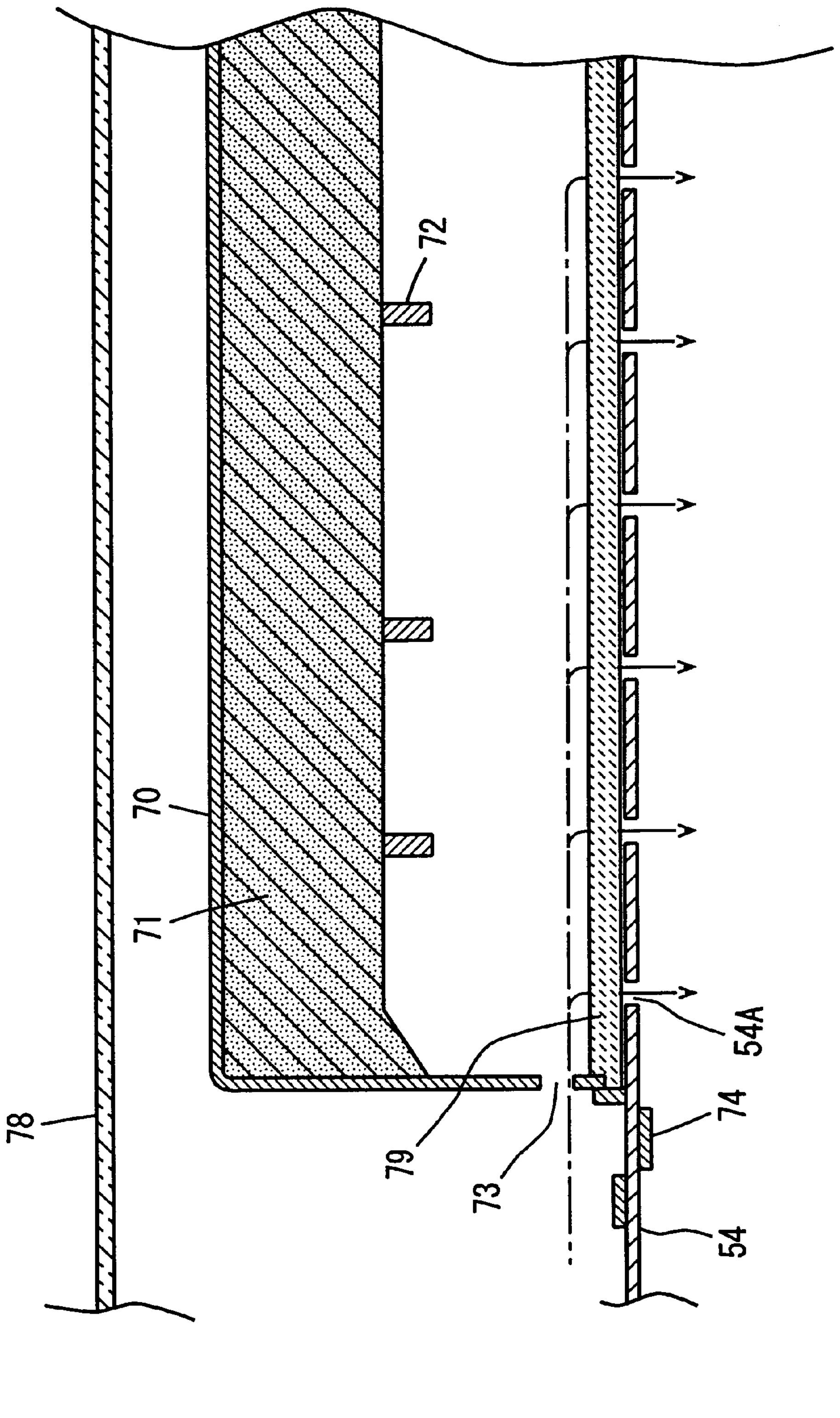
FIGS. 15–21 show modifications of an embodiment of the present invention.

It should be noted that, as shown in FIG. 15, sheet 79 can be posed between case member 70 and heating chamber 50 upper surface 54 to be fixed more firmly.

Figure 16:
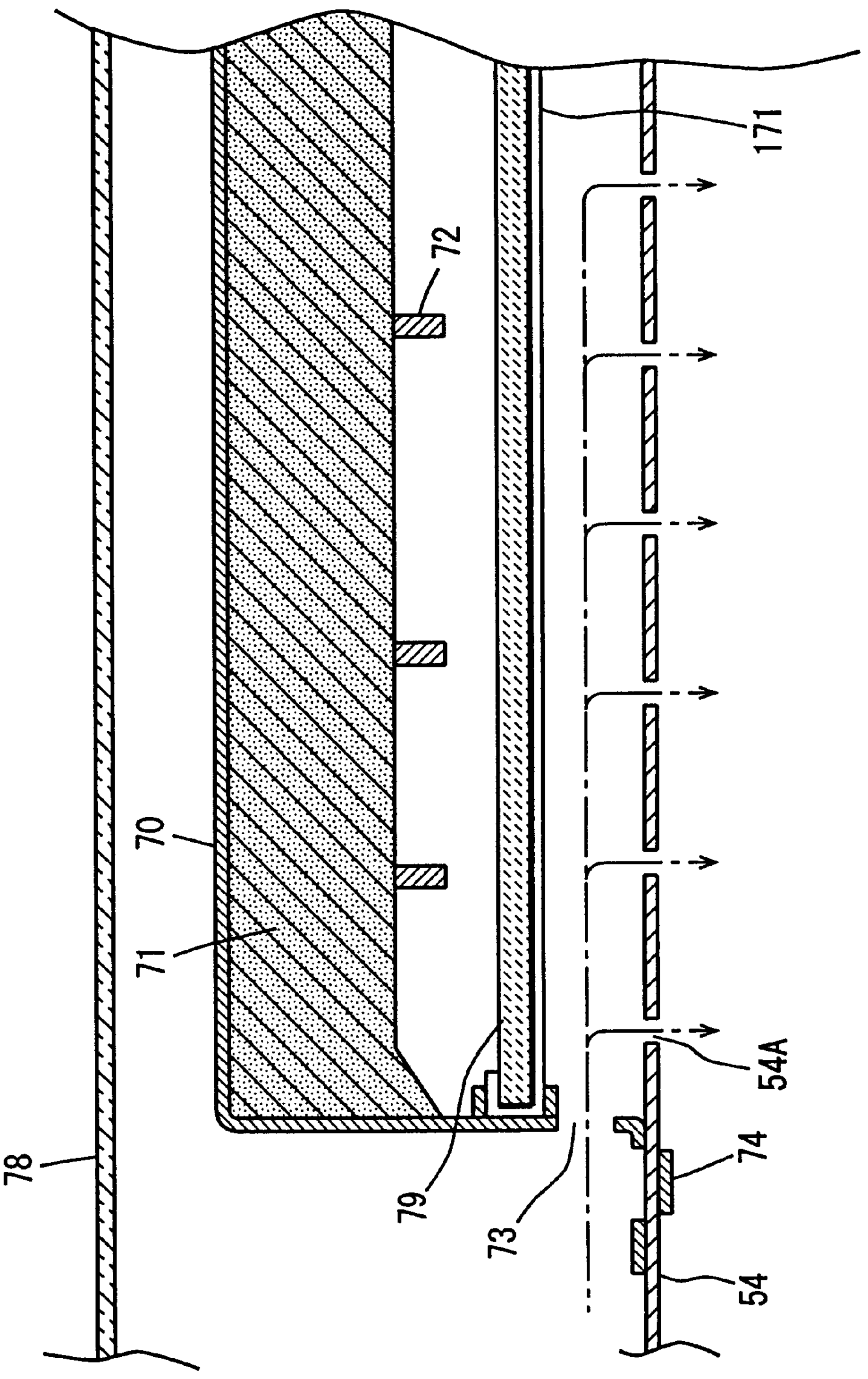

Also, sheet 79 is preferably covered with a heat-resistant cover 171, such as SUS mesh, and thus fixed, as shown in FIG. 16. In using heat emitting member 72 in microwave oven 1 to provide heating, sheet 79 may flex and consequently come into contact with other members and thus degrade. Cover 171 covering sheet 79, however, can prevent sheet 79 from flexure. Thus, in the present embodiment, cover 171 configures a flexure preventing portion.

If an elongate object, such as a metal wire, is inserted into heating chamber 50, the object can break sheet 79 and dangerously come into contact with connection terminal 76. Cover 171, such as SUS mesh, covering sheet 79, however, can prevent such a dangerous situation caused when such an object as mentioned above is inserted into heating chamber 50.

Flexure of sheet 79 can also be prevented by mounting sheet 79 to case member 70 and then winding a metal wire around an outer periphery of case member 70. It should be noted that the metal wire is preferably wound in contact with case member 70 and sheet 79. In this example, the metal wire corresponds to the flexure preventing portion. A single metal wire or a plurality of metal wires may be wound therearound.

Figure 17:
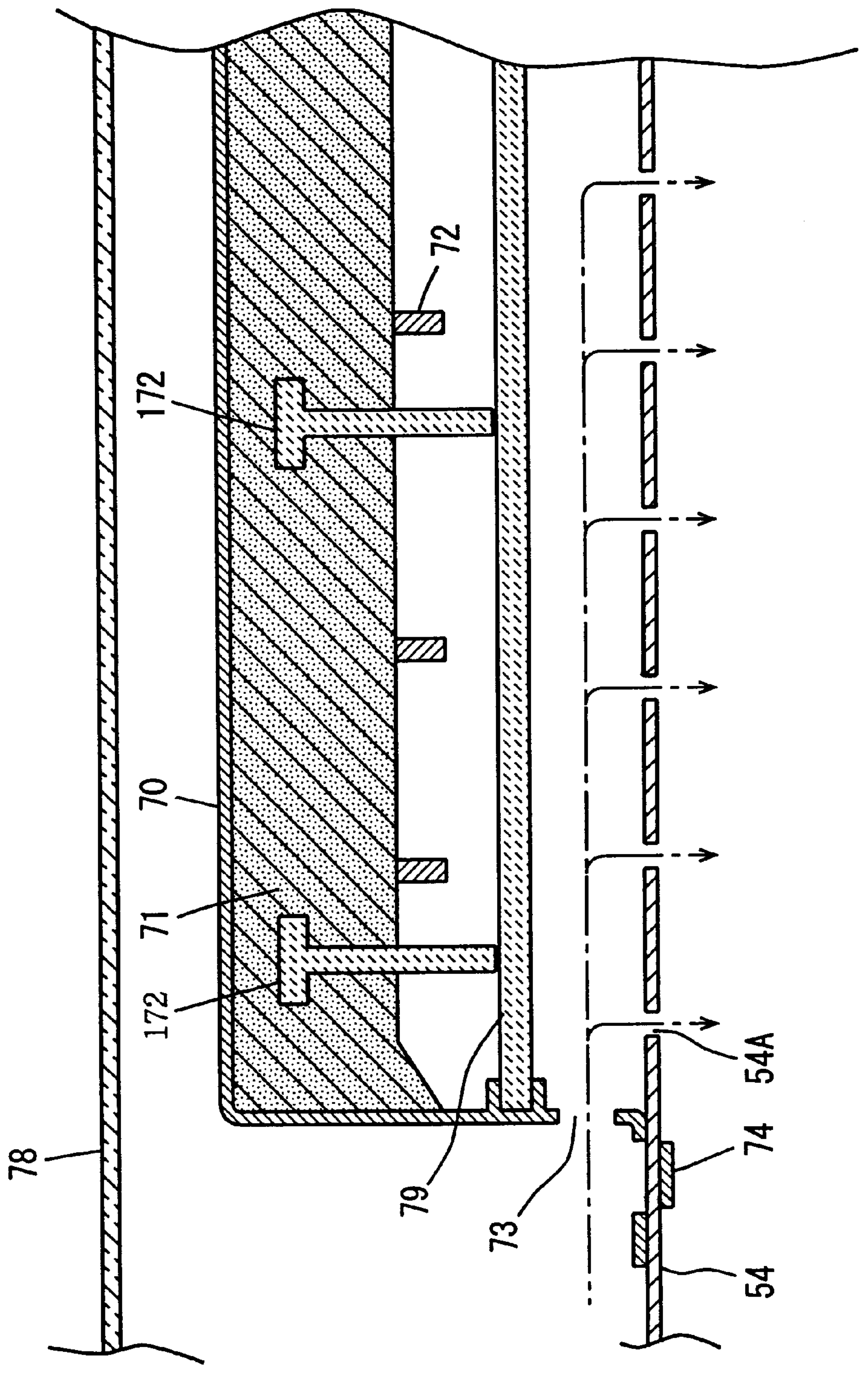

Furthermore, base 71 is preferably provided with a pin 172, as shown in FIG. 17. Pin 172, reliably ensuring a predetermined distance between sheet 79 and heat emitting member 72, can prevent sheet 79 from preventing heat emission from heat emitting member 72.

Figure 18:
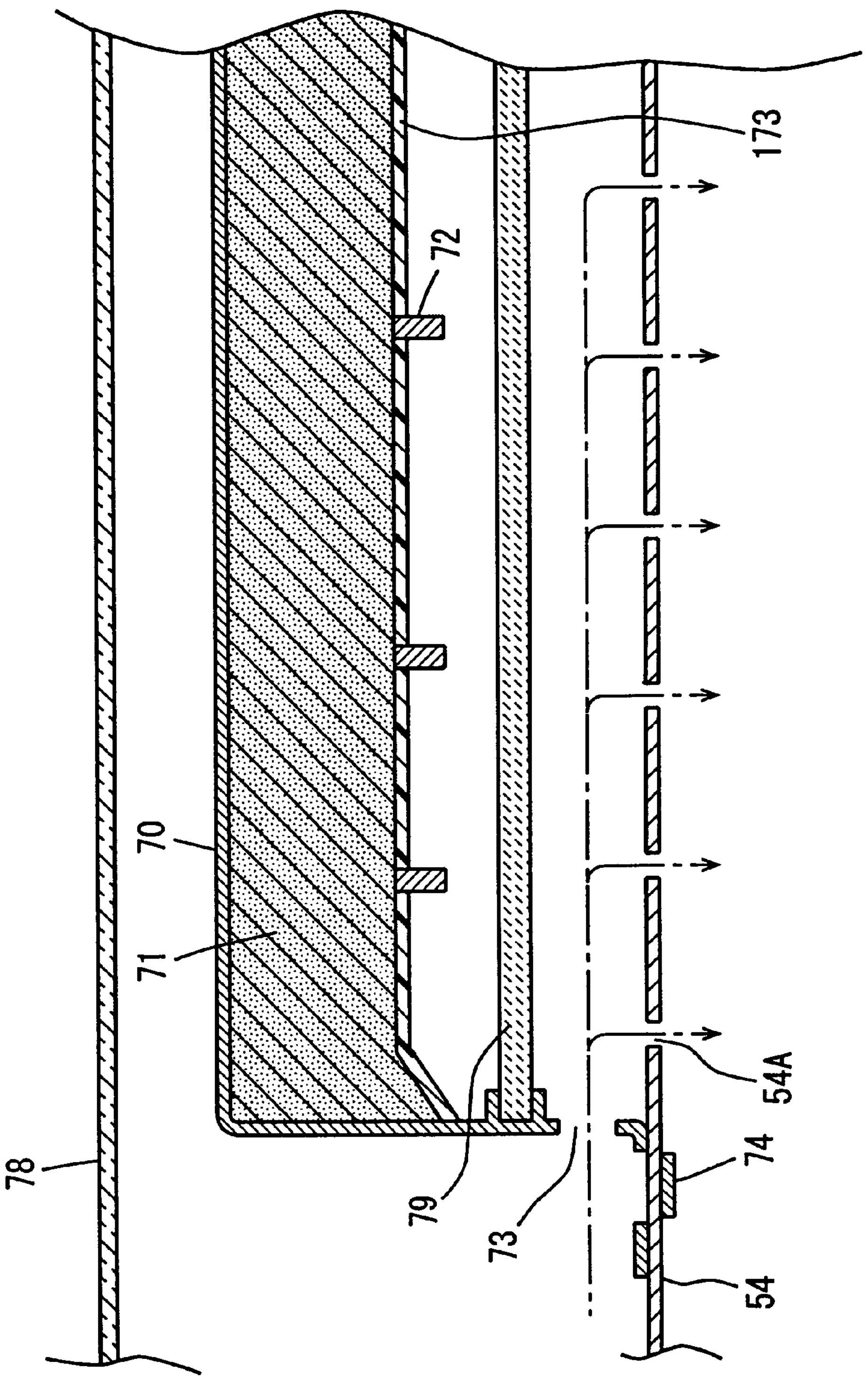

Furthermore, a coating layer 173 is preferably formed on a surface of base 71, as shown in FIG. 18. Coating layer 173 is formed e.g. of ceramics, capable of reliably preventing the sand-like substance forming base 71 from dropping to heating chamber 50 through upper hole 54A.

Figure 19:
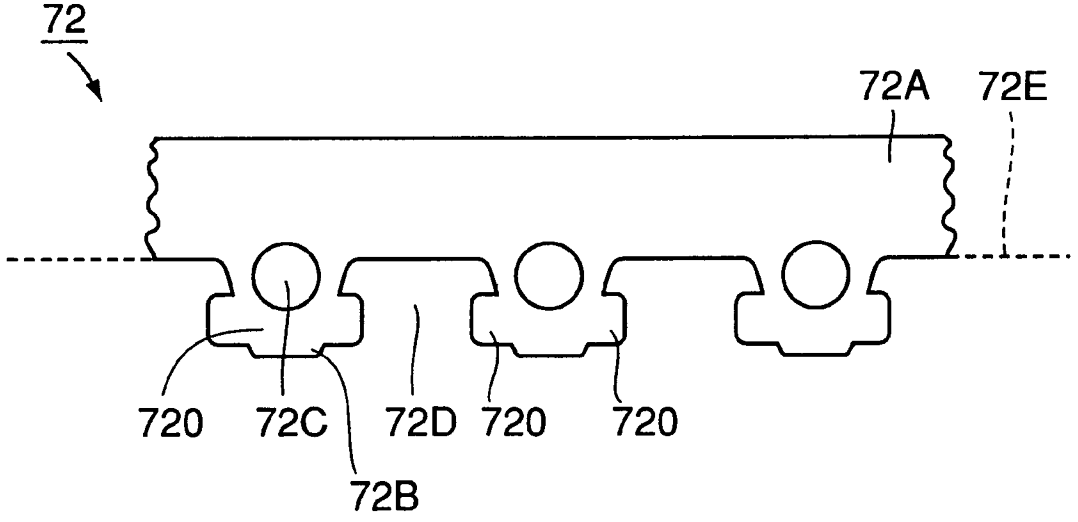

As has been described above, heat emitting member 72 has tab 72B buried into base 71 below line 72A shown in FIG. 7 so that heat emitting member 72 is mounted on base 71. It should be noted that heat emitting member 72 tab 72B is preferably provided with a protrusion 720, as shown in FIG. 19. Tab 72B is provided on one side of strip 72A in a direction traverse to the longitudinal direction of strip 72A, while protrusion 720 protrudes in a direction traverse to the direction traverse to the longitudinal direction of strip 72A. Thus protrusion 720 can engage with base 71 and tab 72B buried in base 71 is thus less likely to come off base 71. Thus heat emitting member 72 is mounted on base 71 more stably.

Preferably, upper hole 54A has a diameter of no more than 4 mm to prevent an elongate stick-like object inserted into heating chamber 50 from reaching base 71 via upper hole 54A. Thus the stick-like object can be prevented from reaching base 71 and scraping off the sand-like substance forming base 71 so that fragments of the sand-like substance drop onto heating chamber 50.

It is also preferable in the present embodiment described above that an insulating plate (shown in FIG. 14) formed of a similar material to sheet 79 be also provided between heater 7 and exterior portion 4 to more reliably prevent the temperature of exterior portion 4 from elevating when heat emitting member 72 is used to provide heating.

In accordance with the present embodiment described above, heater 7 configures a heating portion heating foods. While in the present embodiment the heating portion is provided over the heating chamber such that side of the base bearing a heat emitting member faces downward, the arrangement of the heating portion according to the present embodiment is not limited to such an arrangement as described above. The heating portion may be arranged near a side or bottom side of the heating chamber. In other words, the heat emitting member bearing side of the base may face either leftward or rightward, or upward, as long as it faces the heating chamber and another side of the base that is opposite to the heat emitting member bearing side of the base faces the exterior portion.

It should be noted, however, that providing a heating portion near an upper side of the heating chamber with the heat emitting member bearing side of the base facing downward, as in the present embodiment, particularly provides the following three effects. One effect is that the food in the heating chamber can be heated uniformly. Another effect is that the heating portion is not soiled if the food placed in the heating chamber drops. The other effect is that dropped food can be prevented from burning on the heating portion when the temperature of the heating portion is high.

Figure 20:
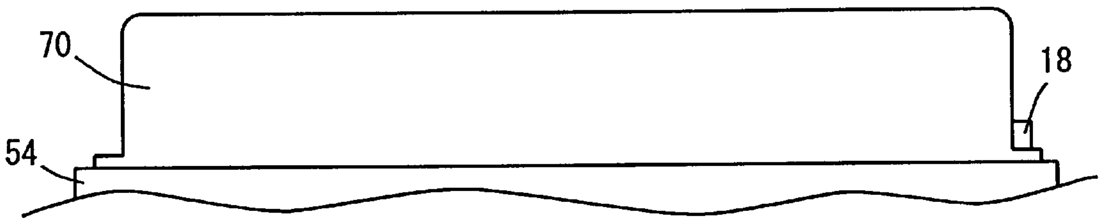
Figure 21:
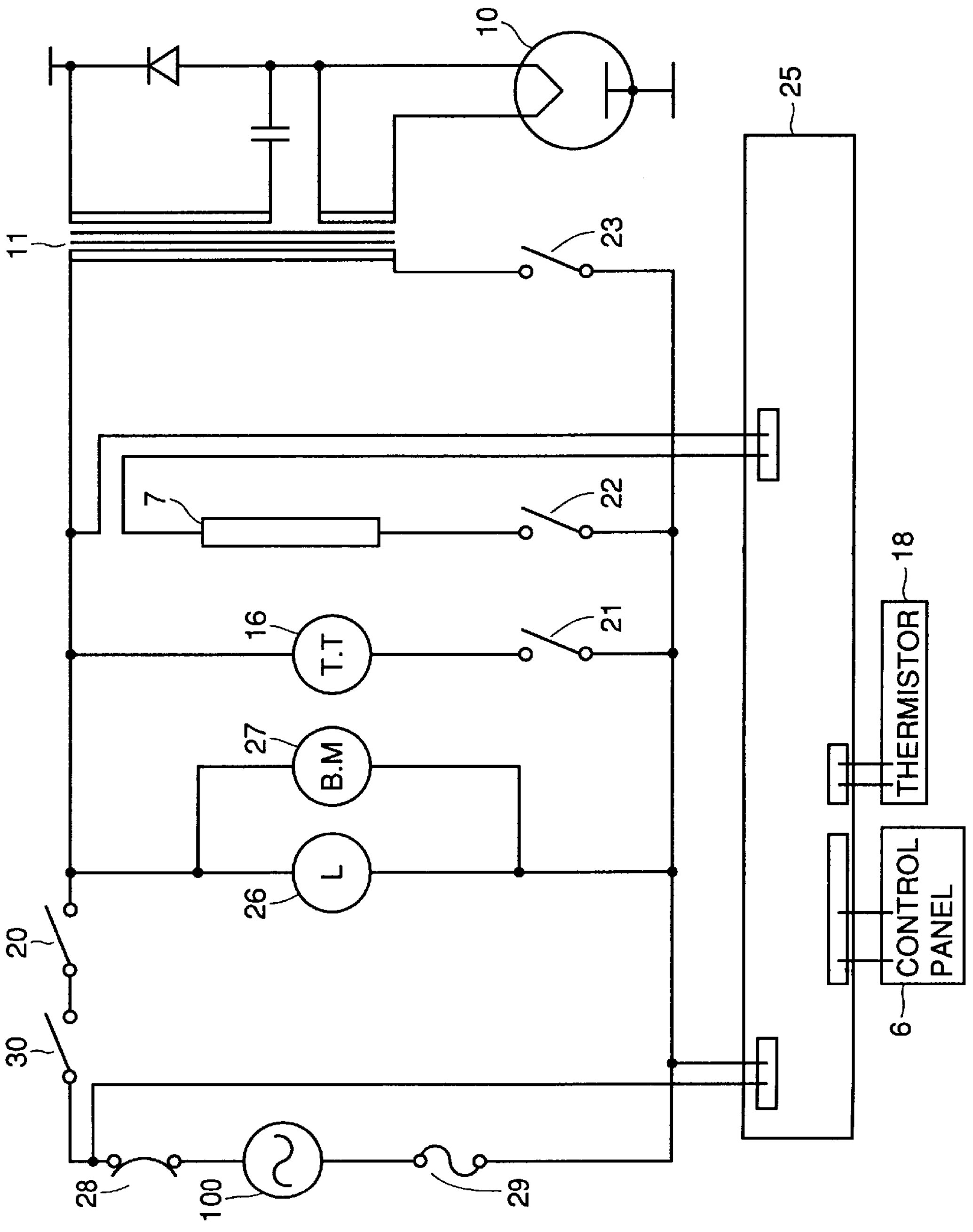

In accordance with the present embodiment, microwave oven 1 can be controlled depending on the temperature detected by thermistor 18 provided near heating chamber 50, as has been described with reference to FIG. 2. As shown in FIG. 20, thermistor 18 is preferably mounted to an outer surface of case member 70. In this example, thermistor 18 detects a temperature around heater 7. By changing the electrical configuration of microwave oven 1 from that shown in FIG. 2 to that shown in FIG. 21, heater 7 is stopped from heating in microwave oven 1 when the temperature around heater 7 reaches a predetermined temperature (e.g., 150° C.). In the FIG. 21 electrical circuit, control circuit 25 disconnects AC power supply 100 from heater 7 when the temperature detected by thermistor 18 reaches the predetermined temperature, and control circuit 25 connects AC power supply 100 to heater 7 when the temperature detected by thermistor 18 drops below the predetermined temperature. Thus, exterior portion 4 can be reliably prevented from being heated to dangerous, high temperatures.

Figure 22:
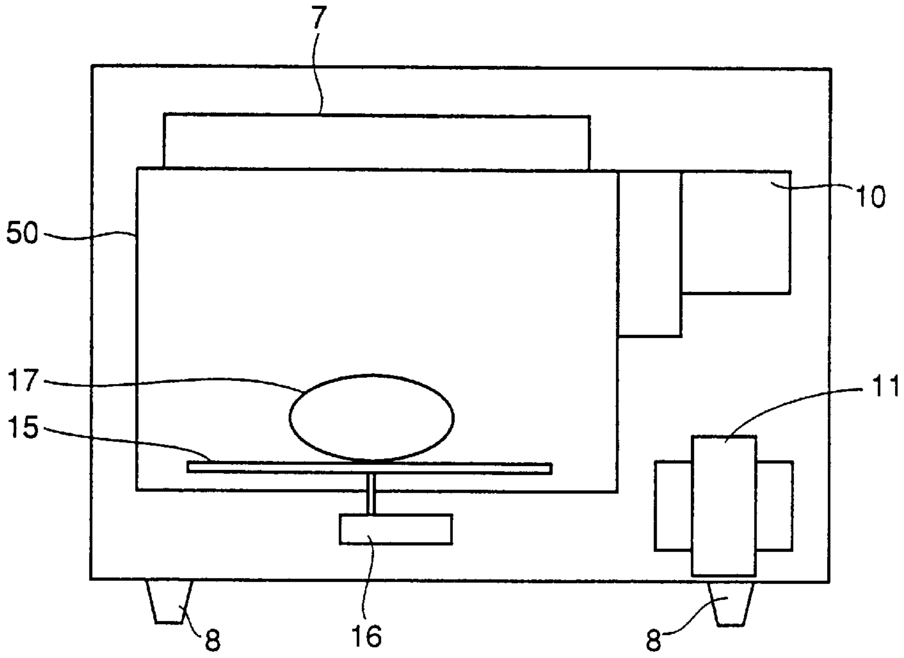
FIG. 22 schematically shows a structure of a body frame of the FIGS. 1A and 1B microwave oven.
Figure 26:
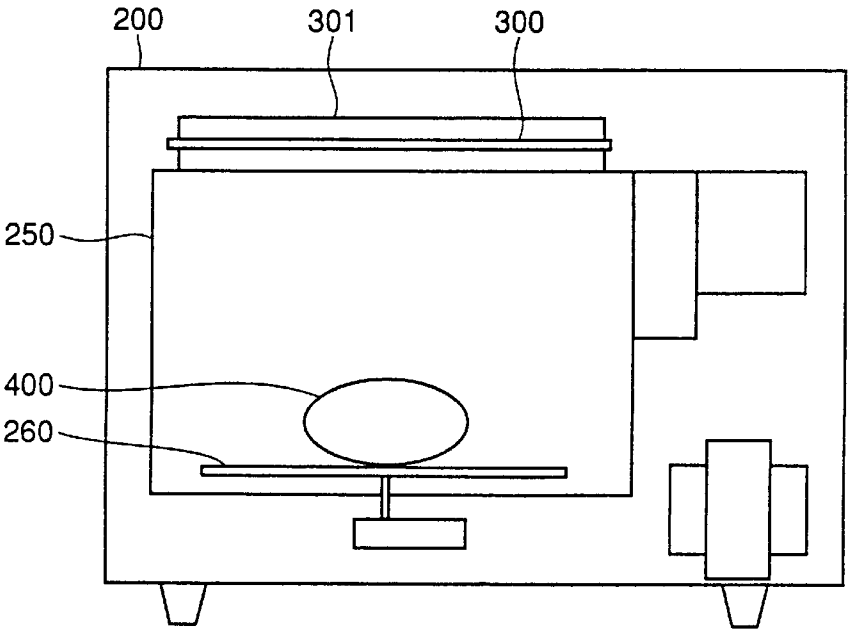
FIG. 26 PRIOR ART
FIG. 26 schematically shows one example of the internal structure of a conventional heat cooking device.

According to the present embodiment, heating chamber 50 is provided with a turntable, as described with reference to FIG. 2. FIG. 22 schematically shows a configuration of body frame 5. A turntable 15 is provided in heating chamber 50. On turntable 15 is placed a food 17. A turntable motor 16 turns turntable 15 in a horizontal plane. FIG. 22 also shows heater 7, magnetron 10 and transformer 11.

Figure 23:
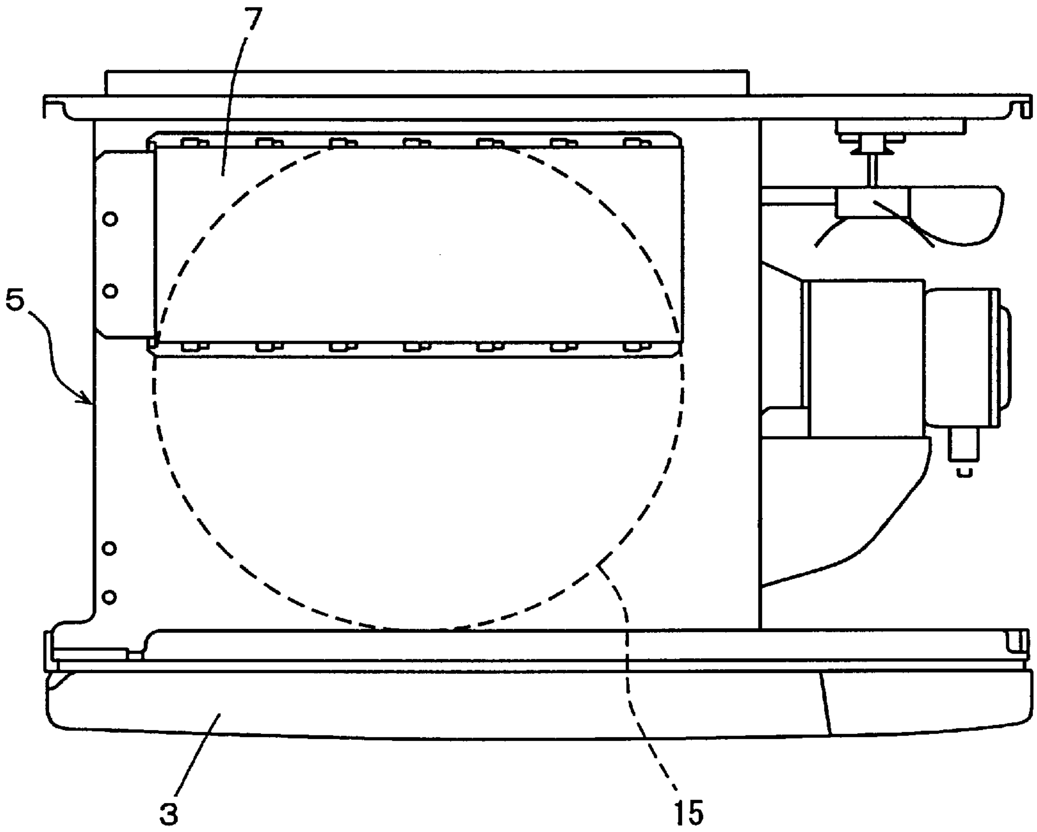
FIG. 23 is a plan view of the body frame of the FIGS. 1A and 1B microwave oven.

As has been described with reference to FIGS. 4A and 4B, plate heater 7 is mounted to body frame 5 upper surface 54 to cover upper hole 54A. FIG. 23 is a plan view of body frame 5. Referring to FIG. 23, heater 7 covers approximately a half area of turntable 15 in heating chamber 50, since turntable 15 turned eliminates the necessity of providing heater 7 covering the entire area of turntable 15. This can reduce members required for heater 7 and hence the cost of microwave oven 1.

While heater 7 is provided covering the half of upper surface 54 that is distant from door 3 at the rear, the present invention is not limited thereto. Heater 7 may have the same area and cover a center portion of upper surface 54. It should be noted, however, that providing heater 7 to cover the rear half of upper surface 54 can enhance the safety of microwave oven 1, since heater 7 heat foods at a position further distant from door 3.

Figure 24:
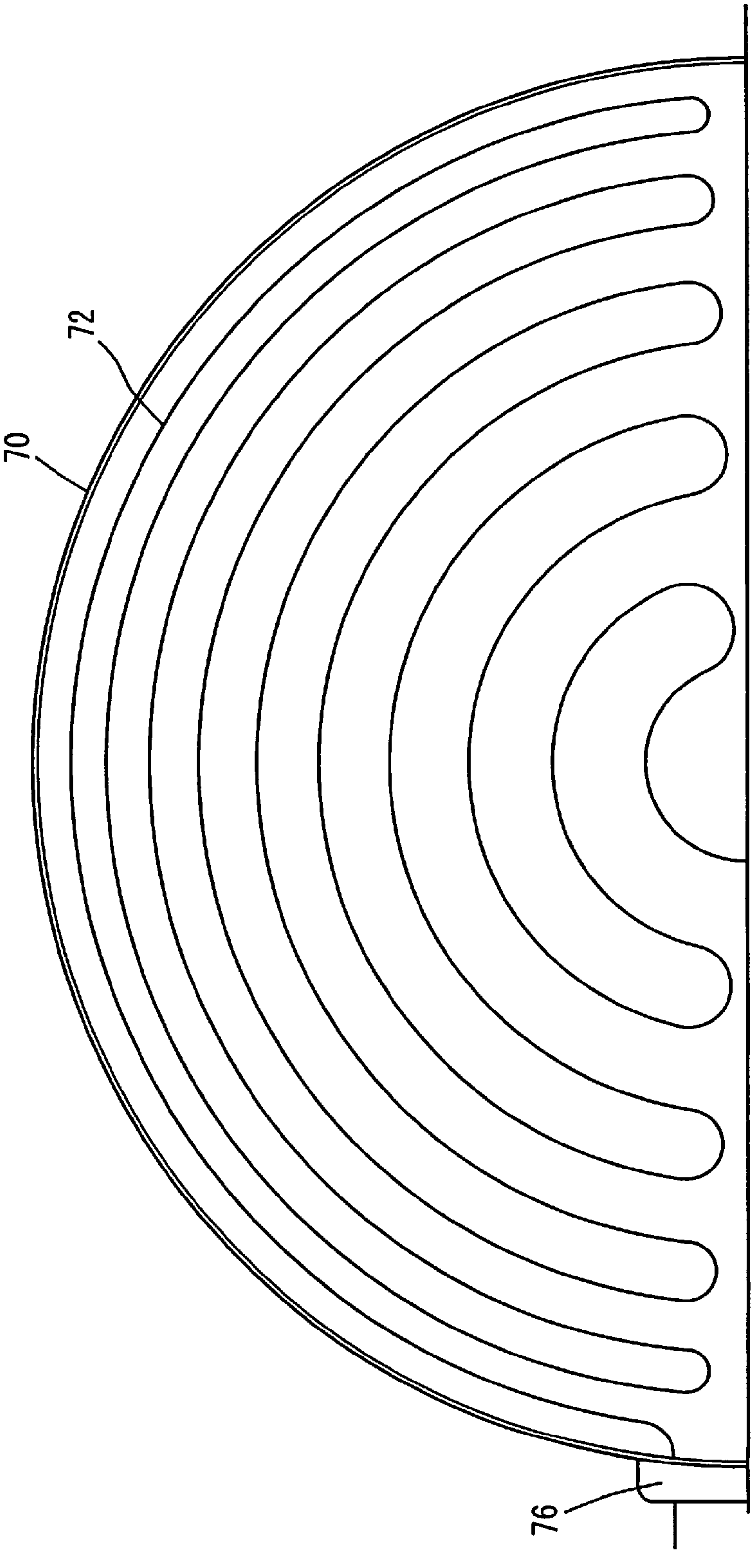
FIG. 24 shows a modification of an embodiment of the present invention.

When turntable 15 turns, a food placed near the periphery of turntable 15 moves to a position farther from heater 7 than a food placed near the center of turntable 15. Accordingly, it is preferable that heater 7 has heat emitting member 72 having a density higher at a portion covering that location on turntable 15 which corresponds to a shorter turning radius than at a portion covering that location on turntable 15 which corresponds to a shorter turning radius. FIG. 24 shows a specific example thereof.

Referring to FIG. 24, heater 7 case member 70 has a semicircular shape. Heat emitting member 72 is arranged to from a plurality of concentric semicircles such that outer semicircles are arranged at smaller intervals. Case member 70 is mounted such that the periphery of case member 70 covers the periphery of turntable 15.

Figure 25:
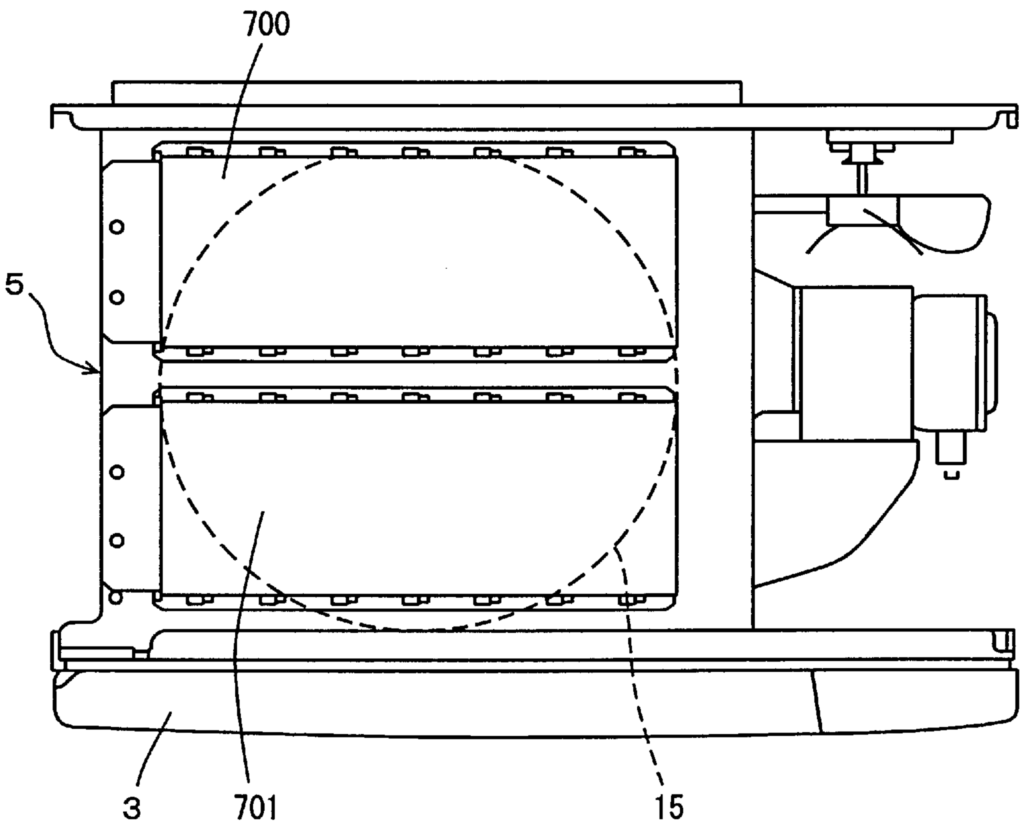
FIG. 25 shows a modification of an embodiment of the present invention.

In microwave oven 1, heater 7 may be provided to cover the entirety of turntable 15. For example, as shown in FIG. 25, microwave oven 1 can be provided with a heater 700 covering the rear half of turntable 15 and a heater 701 covering the front half of turntable 15. It is preferable that both or either one of the two heaters heat food, as required.

In accordance with the present embodiment described above, an air introducing portion configured of fan 55 introduces air into the case member. With this configuration, a heating portion with a large heating output in a heat cooking device can be applied to a heat cooking device of the present invention without changing the design of heating portion. Thus, heat cooking devices with large heating output can be manufactured at further reduced cost and the safety of the heat cooking devices can be enhanced.

According to the present embodiment described above, an introduction hole is formed in that side of the case member which faces inwards in the heat cooking device. Thus when heated air leaks from the case member via the introduction hole the air flows into the heat cooking device and is thus less likely to flow to the exterior portion. Thus the exterior portion can be prevented from reaching high temperatures. It should be noted that heated air can leak from the case member via the introduction hole e.g. when the air introducing portion fails to operate.

Referring to FIG. 6, in accordance with the present embodiment the case member configured of case member 70 is open upward so that the air introduced from the introduction hole is exhausted from the open, upper side. Thus in the present embodiment the open side of case member 70 configures an exhaust hole. It should be noted in the present embodiment that the exhaust hole is also formed in that side of the case member which faces inwards in the heat cooking device. Thus the exterior portion can be prevented from being heated to high temperatures, since less of the heated air from inside the case member is sent to the exterior portion.

In accordance with the present embodiment described above the heating portion can be provided external to the heating chamber. This facilitates manufacturing the device, since the heating portion can be mounted more readily than when mounted internal to the heating chamber. In particular, when high frequency (HF) oscillating portion such as magnetron is further provided, as in a microwave oven, the heating portion provided inside the heating chamber requires a member preventing leakage of HF waves to be mounted at the heating portion, since the HF waves caused by the HF wave oscillating portion readily leak outside the device via the heating portion. Providing a heating portion external to the heating chamber, as described in the present embodiment, can prevent leakage of HF waves without particularly mounting to the heating portion a member preventing HF wave leakage. Thus the cost for manufacturing the heat cooking device can be reduced.

Although the present invention has been described and illustrated in detail, it is clearly understood that the same is by way of illustration and example only and is not to be taken by way of imitation, the spirit and scope of the present invention being limited only by the terms of the appended claims.

What is claimed is:

1. A cooking device comprising:

a body frame having a top, a bottom, a front, a rear and two sides and a chamber for accommodating food formed in the body frame and opening toward the front of the body frame;

an exterior surface covering at least two sides and the top of the body frame;

a door attached to the front of the body frame providing access to the chamber;

a magnetron attached to the body frame for cooking by microwaves; and a heater for cooking attached to the body frame at a location between the body frame and the exterior surface, the heater further comprising, a case member having a top and a bottom, the bottom facing the chamber in the body frame;

a thermal and electrical microporus insulator filling the bottom of the case member; and a heat emitting member placed on the bottom the case member, in which during heating by the heat emitting member the exterior surface of the cooking device is heated less than the chamber thereby providing a safe cooking device.

2. The cooking device of claim 1, in which the microporus insulator is obtained by adding a ceramic fiber reinforced material to a microporus substance of dry particles mixed with a small amount of alumina powder.

3. The cooking device of claim 1, in which the microporus insulator is aerogel.

4. The cooking device of claim 1, in which the microporus insulator is coated with a coating layer.

5. The cooking device of claim 1, in which the heat emitting member is an electrical heat emitting member.

6. The cooking device of claim 1, in which the heat emitting member is formed of metal or alloy strips.

7. The cooking device of claim 6, in which the heat emitting member is a strip having at least one tab located on one side of the strip and said tab fitted into the case member to mount the heat emitting member.

8. The cooking device of claim 1, further including a heat-resistant sheet located between the heat emitting member and the body frame of the cooking device.

9. The cooking device of claim 8, in which heat-resistant sheet is a material selected from the group consisting of heat-resistant glass, quartz and mica.

10. The cooking device of claim 8, in which the heat-resistant sheet is covered with a heat-resistant cover for preventing the puncture of the heat-resistant sheet.

11. The cooking device of claim 8, further comprising a flexure preventing the sheet from flexing.

12. The cooking device of claim 8, further comprising a member ensuring a predetermined distance between the heat emitting member and the sheet.

13. A cooking device comprising:

a body frame having a top, a bottom, a front, a rear and two sides and a chamber for accommodating food formed in the body frame and opening toward the front of the body frame;

an exterior surface covering at least two sides and the top of the body frame;

a door attached to the front of the body frame providing access to the chamber;

a magnetron attached to the body frame for cooking by microwaves;

a heater for cooking attached to the body frame at a location between the body frame and the exterior surface and the heater communicating with the chamber via holes in the body frame opposite the heater, said heater further comprising, a case member having a top and a bottom, the bottom facing the chamber in the body frame;

a thermal and electrical microporus insulator obtained by adding a ceramic fiber reinforced material to a microporus substance of dry particles mixed with a small amount of alumina powder and the microporus insulator filling the bottom of the case member;

a heat emitting member placed on the bottom the case member; and a heat-resistant sheet located between the heat emitting member and the body frame;

an insulating plate provided between the heater and the exterior surface; and a fan mounted on the body frame for introducing air into the case member and through the holes in the body frame opposite the heater;

in which during heating by the heat emitting member the exterior surface of the cooking device is heated less than the chamber thereby providing a safe cooking device.

14. The cooking device of claim 13, in which the microporus insulator is aerogel.

15. The cooking device of claim 13, in which the microporus insulator is coated with a coating layer.

16. The cooking device of claim 13, further comprising a flexure preventing the sheet from flexing.

17. A cooking device comprising:

a body frame having a top, a bottom, a front, a rear and two sides and a chamber for accommodating food formed in the body frame and opening toward the front of the body frame;

an exterior surface covering at least two sides and the top of the body frame;

a door attached to the front of the body frame providing access to the chamber;

a magnetron attached to the body frame for cooking by microwaves;

a plate heater for cooking attached to top of the body frame and covering at least half of the top of the body frame at a location between the body frame and the exterior surface and the heater communicating with the chamber via holes in the body frame opposite the heater, said heater further comprising, a case member having a top and a bottom, the bottom facing the chamber in the body frame;

a thermal and electrical microporus insulator filling the bottom of the case member;

a heat emitting member being heat emitting strips placed on the bottom the case member and arranged in concentric semicircles so that the density of the heat emitting strips increases radially away from a point parallel to the center of the chamber in the body frame;

a heat-resistant sheet provided a predetermined distance between the heat emitting member and the body frame;

an insulating plate provided between the heater and the exterior surface; and a fan mounted on the body frame for introducing air into the case member and through the holes in the body frame opposite the heater;

in which during heating by the heat emitting member the exterior surface of the cooking device is heated less than the chamber thereby providing a safe cooking device.

* * * * *